US012141326B1

(12) United States Patent
Barouch et al.

(10) Patent No.: US 12,141,326 B1
(45) Date of Patent: Nov. 12, 2024

(54) ENHANCED DYNAMIC SECURITY WITH PARTIAL DATA ACCESS TO PRESERVE ANONYMITY

(71) Applicant: Online Media Holdings Limited, Surry Hills (AU)

(72) Inventors: Jonathan Barouch, Surry Hills (AU); Peter Williams, Surry Hills (AU)

(73) Assignee: ONLINE MEDIA HOLDINGS LIMITED, Surry Hills (AU)

( * ) Notice: Subject to any disclaimer, the term of this patent is extended or adjusted under 35 U.S.C. 154(b) by 0 days.

(21) Appl. No.: 18/634,574

(22) Filed: Apr. 12, 2024

Related U.S. Application Data

(60) Provisional application No. 63/616,269, filed on Dec. 29, 2023.

(51) Int. Cl.
  *G06F 21/62* (2013.01)
  *G06F 21/31* (2013.01)
(52) U.S. Cl.
  CPC .......... *G06F 21/6254* (2013.01); *G06F 21/31* (2013.01)
(58) Field of Classification Search
  CPC .............................. G06F 21/6254; G06F 21/31
  See application file for complete search history.

(56) References Cited

U.S. PATENT DOCUMENTS

| | | | |
|---|---|---|---|
| 10,552,637 B1 * | 2/2020 | Phillips ................... | G06Q 40/06 |
| 11,093,632 B1 * | 8/2021 | Ton-That ............... | G06N 20/00 |
| 11,250,157 B2 * | 2/2022 | Apsingekar ............... | H04L 9/50 |
| 11,496,446 B1 * | 11/2022 | Angara .................. | G06F 16/955 |
| 2008/0086766 A1 * | 4/2008 | Kaler ...................... | G06F 21/33 |
| | | | 713/172 |
| 2018/0262503 A1 * | 9/2018 | Dawson ................. | H04L 9/3239 |
| 2020/0374129 A1 * | 11/2020 | Dilles .................... | H04L 9/3273 |
| 2022/0027499 A1 * | 1/2022 | Watkins ............... | G06F 16/2379 |
| 2022/0156406 A1 * | 5/2022 | Yang ................... | G06F 21/6254 |
| 2022/0272124 A1 * | 8/2022 | Zawadzki ............. | H04M 15/62 |

FOREIGN PATENT DOCUMENTS

| | | | | |
|---|---|---|---|---|
| CN | 112913203 A | * | 6/2021 | .......... G06F 11/3006 |
| WO | WO-2021147442 A1 | * | 7/2021 | ............. G06F 21/31 |
| WO | WO-2023215930 A1 | * | 11/2023 | ............. G06Q 20/40 |

* cited by examiner

*Primary Examiner* — Christopher A Revak
(74) *Attorney, Agent, or Firm* — K&L Gates LLP

(57) ABSTRACT

Enhanced dynamic security with partial data access to preserve anonymity is provided herein. An example method comprises storing personally identifying information (PII) about an end user in a database, organizing data in the database into tokens, determining, upon receiving a request for the PII from an agent in communication with the end user, that the agent is authorized to access the PII, granting the agent temporary access to the PII, and removing the PII from a device associated with the agent.

20 Claims, 8 Drawing Sheets

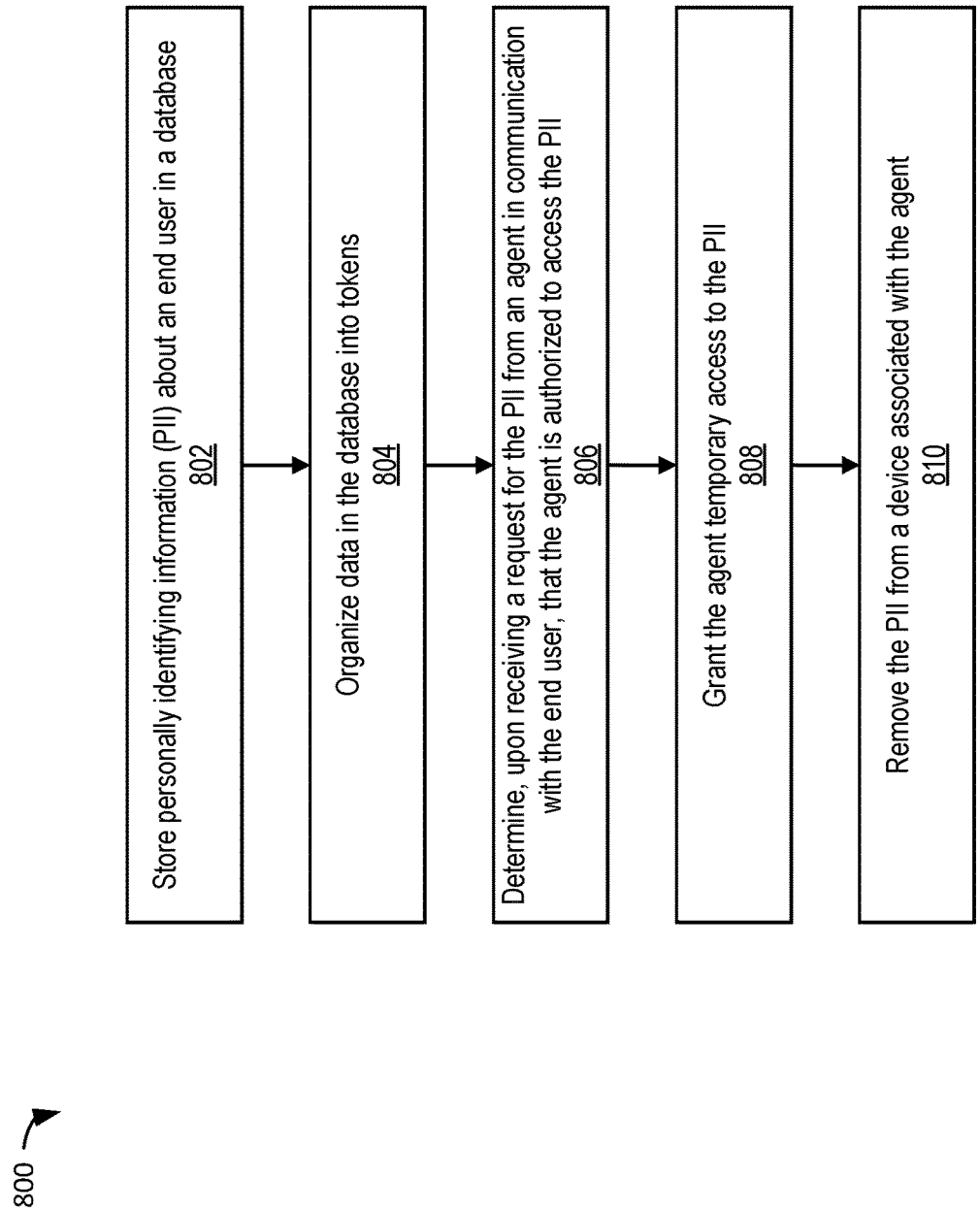

ENHANCED DYNAMIC SECURITY WITH PARTIAL DATA ACCESS TO PRESERVE ANONYMITY

CROSS-REFERENCE TO RELATED APPLICATIONS

The present disclosure claims the benefit of U.S. Provisional Patent Application No. 63/616,269 entitled "ENHANCED DYNAMIC SECURITY WITH PARTIAL DATA ACCESS TO PRESERVE ANONYMITY" and filed on Dec. 29, 2023, which is incorporated herein by reference in its entirety.

BACKGROUND

Computerized information access control systems are charged with regulating access to many differing types of sensitive data. Many computerized information access control systems rely on categorizing data in a tiered system of varying degrees of restriction, in which an individual who possesses a given level of authorization may access data equal or lower to their authorization level. Machine learning typically involves training a data model to recognize and react to patterns in desirable ways. Training of data models can be supervised, in which training data is provided along with "answer key" data indicating a desired behavior or describing the training data, unsupervised, in which the training data is provided without additional context, or semi-supervised, a combination of supervised and unsupervised training.

SUMMARY

Systems, methods, and apparatuses are provided for implementing enhanced dynamic security with partial data access to preserve anonymity. An example method comprises storing personally identifying information (PII) about an end user in a database, organizing data in the database into tokens, determining, upon receiving a request for the PII from an agent in communication with the end user, that the agent is authorized to access the PII, granting the agent temporary access to the PII, and removing the PII from a device associated with the agent.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter.

BRIEF DESCRIPTION

The description will be more fully understood with reference to the following figures, which are presented as exemplary aspects of the disclosure and should not be construed as a complete recitation of the scope of the disclosure, wherein:

FIG. 8 illustrates a flowchart for an example method, according to example embodiments of the present disclosure.

DETAILED DESCRIPTION

Figure 1:
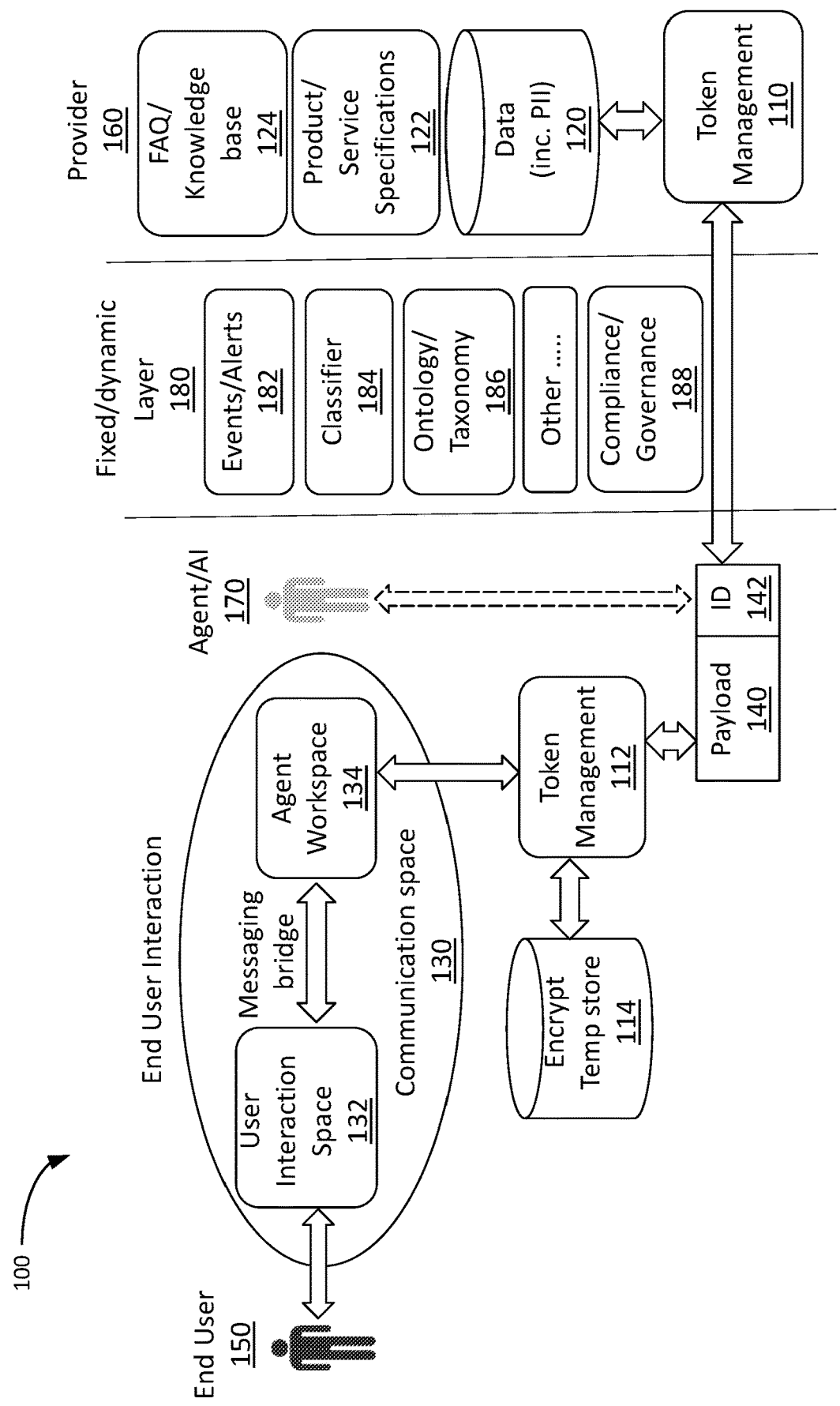
FIG. 1 illustrates an example access event, according to example embodiments of the present disclosure.

Many computerized information access systems already exist and are used within large organizations to handle data access at large scales, however the need on one hand to control the distribution of personal identifying information (PII), whilst supporting day-to-day operations with enough detail is not well served by existing systems. Most systems currently in use have restrictive rules-based governance for the management of PII, which often leads to inflexible data access restrictions which may delay or limit operational efficacy. A further aspect is that many applications of access control systems involve multiple synchronous and asynchronous access events, often involving many differing actors, across multiple discontinuous time periods, all of which can significantly exacerbate the shortcomings of existing systems and increase the potential for disclosure or mishandling of PII.

The present disclosure describes a new approach to these issues, with a focus on improved security and handling of PII in combination with improved ease of data access whilst reducing the time and costs of such interactions. This includes focusing on omnichannel and multi-mode communication where users traverse communication methods in real time. This can involve interactions being processed in real-time and at scale, fusing AI, project context, and complex end user data (such as recommendations) without processing or storing any end user personally identifiable information.

A challenge for many organizations is the management of personal identifying information (PII) such that this information is only available to the authorized and authenticated parties for the uses to which they are entitled and for one or more access events.

As referenced in the present disclosure, a provider may be a group of systems controlled and/or operated by an organization responsible for the PII of an end user, where that end user has one or more transactional relationships with the provider for one or more products and/or services. There are several considerations to be addressed in pursuit of tracking and tracing PII use in end user service access events, including but not limited to developing one or more mechanisms to analyze message metadata for continuity in asynchronous access events involving potentially multiple conversation threads, ensuring sufficient end user data is available to one or more human and/or computer agents for ongoing interactions, whilst accommodating diverse communication variations, development of data structures for comprehensive end user profiling, creation of one or more generalized methodologies in response and relation to various metadata types, management of PII in the form of secure tokens, and synchronization of agent applications with underlying storage technologies in both agent operations and/or provider systems.

To adequately handle queries, existing computerized access control systems often allow agents access to sensitive data, which can include PII. This access to sensitive data is generally defined by a set of access rules, which may include what sets of sensitive data are available, which agents and/or agent groups can access the sensitive data, how long the sensitive data can be accessed for, with least privilege and minimum system timeouts applied, and how data is restricted to the agent's current systems and communication channels (e.g. the agent cannot share in other systems). Current systems generally require providers of the data to define access rules statically. Static access levels adopt a "one-size-fits-all" approach when allowing access to the data. This means that there will be numerous scenarios where the static access rules are overly restrictive and in many cases are inadequate to satisfy an end user query. In other cases, the static access rules can be overly permissive and pose a risk to the provider through unauthorized dissemination of provider data including PII. These current situations can pose significant business risks including but not limited to overly permissive access rules that leave open the possibility of data leakage to one or more unauthorized parties and overly restrictive access rules that create situations whereby an agent is unable to satisfy end user requests due, at least in part to a lack of end user data and context, leaving dissatisfied end users.

In most circumstances, data that is accessed via an agent workstation is communicated outside of the secure data storage center, to an endpoint that is accessible to the agent, leaving open further risk of data leakage to one or more unauthorized parties.

In this document, an end user may be a person(s) and/or organization that has transacted with a provider for a product and/or service, and may be a device belonging to the same. For example, a bank would be a provider and an end user may be a device associated with an individual who has one or more accounts with that bank. In another example a provider may be a product vendor, and the product purchaser is the end user. In some situations, there may be multiple parties involved in the transaction, for example a retailer, dealer, or other intermediary as well as outsourced end user service organizations (commonly known as a BPO), all of which makes the handling and management of PII even more important and relevant.

Current computerized information access control systems typically have limitations that include treating all agents as equals. That is to say, elevated accesses to PII are either all or nothing, there is no intelligence to only provide the level of access for the specific tasks, access typically has no temporal mechanisms to prevent access to sensitive end user data (PII) indefinitely, verification techniques are often outdated and easy for unauthorized people to copy to gain access, and inadequate data encryption methods are typically used.

In many environments, a provider, for example an organization, may have disparate and distributed data sets pertaining to their products and/or services. Much of this data can be considered proprietary and, in some cases, confidential, representing, at least in part, the intellectual property of the provider. Such data may include specifications of the products and/or services deployed and/or the deployment of such with one or more end users, where such end user information can include PII.

Such data sets can, for example, include various types of documentation of a product and/or service, including, for example, terms of service and/or product performance terms. This can, in some circumstances, include licenses or other rights for a product and/or service to which an end user is entitled through their one or more transactions with a provider for product and/or service. The degree and specifics of the data set is often provider specific, in that each provider has a certain set of systems, including repositories that store and manage such information sets.

Embodiments of the present disclosure aim to remedy the deficiencies of existing systems described herein with the employment of machine learning, digital twinning, and tokenization of data. By segmenting data into tokens, including data which may contain PII, access to data segments can, via the tokens, be controlled on a much more granular and targeted basis than existing systems. Machine learning can be utilized to better regulate information access and leverage the tokenized data, while digital twinning may be employed to improve processes and systems relating to the tokenized data, including but not limited to training machine learning models.

As used in the context of the present disclosure, a token may be a non-sensitive substitute for a sensitive payload data which may be reversible (e.g. the payload data may be mathematically extracted from the token itself) or which may reference a secure store of data containing the payload data. The payload data may be a data segment, that is to say that the payload data may comprise a portion of a larger piece of data or a dataset. Data segmentation may take a form wherein a set or piece of data is broken up to fit within standard-length data structures, and sets or pieces of data may be reassembled from multiple segments/tokens for use. As used in the present disclosure, the term "agent" may refer to a human interacting with an end user, a computer program or machine learning model interacting with an end user, and combinations thereof. As used in the present disclosure, the term "user interaction space" may refer to any environment in which an end user may interact with an agent or a system of the present disclosure, including but not limited to a graphical user interface (GUI), a phone call, an in-person environment, an instant messaging interface, a webpage, and combinations thereof. As used in the present disclosure, the term "digital twin" may refer to a data-based model of an original object, event, or piece of data rendered so that operations may performed on the digital twin to predict a behavior of the original object, event, or piece of data without affecting the original object, event, or piece of data.

FIG. 1 illustrates an example access event 100, according to example embodiments of the present disclosure. An end user 150 interacts with an agent or AI 170 via a user interaction space 132 linked to an agent workspace 134 with a messaging bridge within a communication a 130. The agent workspace 134 interacts with an agent token management system 112 coupled to an encrypted temporary storage 114 containing tokens. An example token is shown being retrieved by the agent token management system 112. The example token contains a payload 140 and an identifier 142. The example token is being retrieved in the example access event 100 from a database token management system 110 in communication with a pool of data 120. The pool of data 120 may be maintained and managed by a provider 160, and may be provided alongside a knowledge base 124 and/or product/ service specifications 122. The pool of data 120 may contain personally identifying information (PII) that is sensitive in nature. Tokens from the database token management system 110 may pass through a fixed or dynamic layer 180 executing modules such as but not limited to an alert module 182, a classifier 184, an ontology/taxonomy module 186, and a compliance verifier 188.

When a request for information is sent by the Agent/AI 170 during an interaction with the end user 150, the agent workspace 134 contacts the agent token management system 112, which forwards the request to the database token management system 110. The database token management system may determine whether the requested information should be distributed to the agent/AI 170 and access the pool of data 120 to retrieve the requested information. Upon determining that the information should be sent, the database token management system 110 may send the example token containing the requested information in a payload 140 through the fixed or dynamic layer 180 which may perform a series of verification processes to ensure that the requested information is being sent to an authorized agent/AI 170 and that the requested information is relevant to the interaction with the end user 150. Once any verification checks determine that the example token is authorized for transmission, the example token will be sent to the agent token management system 112. The agent token management system 112 may then store the example token in the encrypted temporary storage 114. Upon expiry of the example token or an end to the interaction with the end user 150, the agent token management system 112 may purge the example token from the encrypted temporary storage 114.

In some embodiments there may be one or more token management systems 110, 112 for the creation, processing and/or redemption of one or more tokens.

A token manager system 110, 112 may include identity management systems where tokens created by the token management system 110, 112 may only be accessible by those with authenticated identities known to and/or registered with, through reference and/or embedding, a token manager 110, 112. Authentication of such identities can include, for example, biometrics and other human authentication techniques and/or fingerprinting, location and network authentication and similar end point authentication techniques, which may be combined in any arrangement.

In some embodiments, an agent 170 may employ one or more secure PPE (protected processing environments), within their workspace and/or in one or more devices bound to their identity, for example this can include smart phones and may include one or more secure clocks that provide an authenticated reliable time source.

One aspect of ensuring that there is an effective boundary for the protection of PII may be the use of combinations of identities, events, actions, contexts and/or temporal data to support and/or enable access to one or more token payload 140, in whole or in part. For example location, which may include both physical and/or logical, identity which may be physical, biometric, digital fingerprint, temporal, contextual (including but not limited to process, topic related, product/service related, end user 150 related), and metering of token data usage, including creating one or more audit trail of use of data and relationship of data usage to service journeys and/or outcomes.

Figure 2:
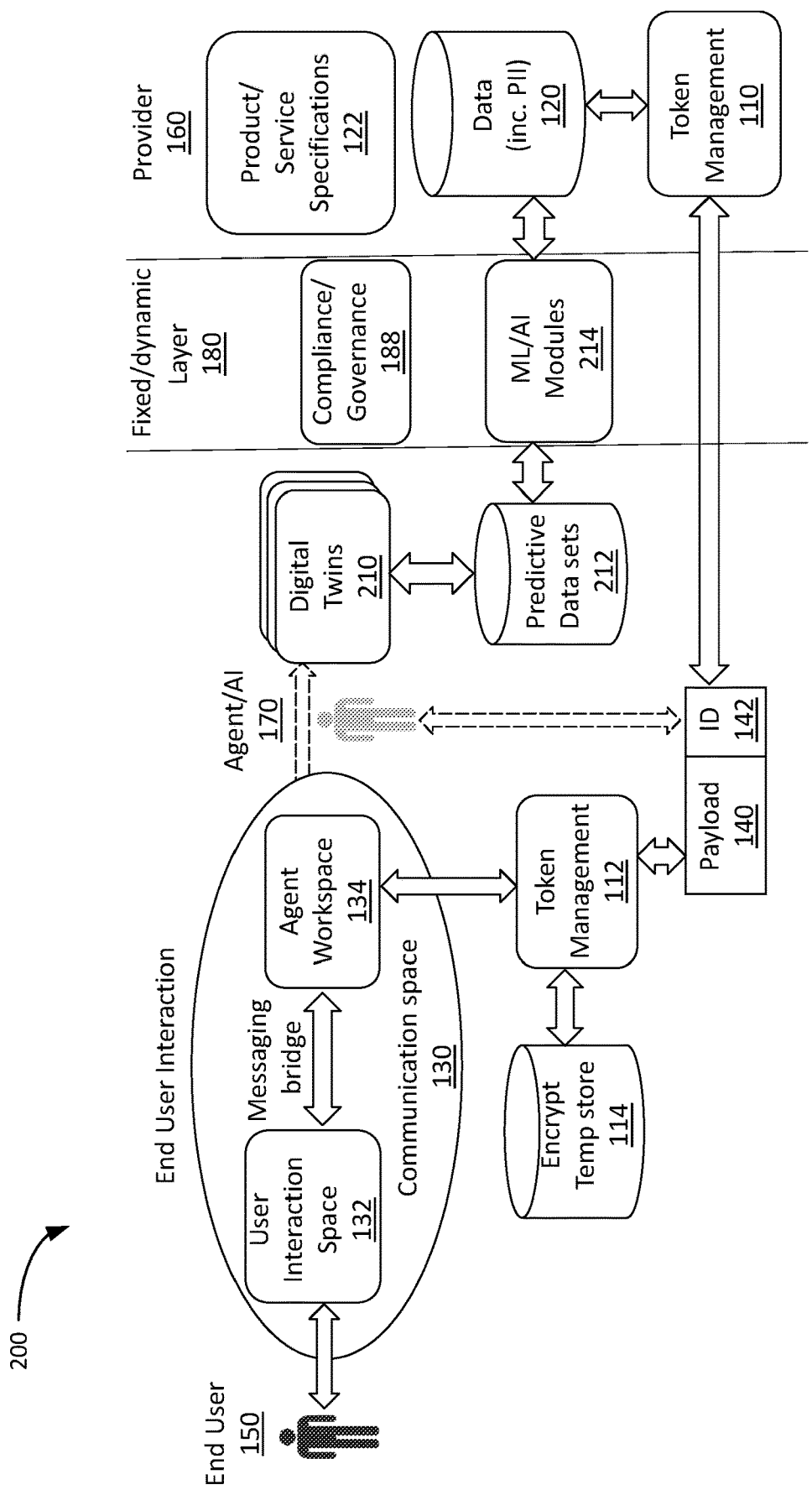
FIG. 2 illustrates an example access event with digital twins, according to example embodiments of the present disclosure.

FIG. 2 illustrates an example access event 200 with digital twins 210, according to example embodiments of the present disclosure. A system very similar to that of FIG. 1 is illustrated, however this example includes the use of digital twins 210 to train the agent/AI 170. The digital twins 210 can be used to create predictive data sets 212 that allow machine learning modules 214 to improve performance in future interactions with end users 150.

In some embodiments, there may be one or more digital twins 210 which represent the product and/or service. This digital twin 210 can, at least in part, represent the product and/or service. For example, a digital twin 210 of a product can have the same inputs and outputs and will operate in the same manner as the physical product based on the configuration and specifications 122. These digital twins 210 may be hosted by the provider and/or by their proxy and can be made available to one or more agents 170 of an organization. The same approach may be applied to services, where the specification of the service and the one or more API for accessing the service may be represented by one or more digital twins 210. In the example of the service, such as a bank account, the transactions may be available to the agent 170 in the form of a digital twin 210, however the PII may not be made available to the agent 170 involved in the access event 200.

In some embodiments, digital twins 210 may be used to create models of access events and end user service journeys. For example, one or more digital twins 210 may provide a framework, based at least in part on previous end user 150 interactions and/or predicted interactions. This can include provision to one or more agents of a set of digital twins 210 representing the possible access events that, including the unfolding actions of the end user 150.

In some embodiments, one or more machine learning modules 214 may be used to create a set of possible access events that end users 150 may have with an agent 170, determined at least in part, by the type of service journey the end user 150 has embarked upon, which can include a product and/or service involved in that journey.

This set of possible access events may be stored as a set of predictive data sets 212, where for example the activities and communications regarding a service journey, represented by access events, are arranged in a manner that can be accessed by one or more agents 170 as the actual real time access event of the service journey unfolds. In this manner the agent 170 may have available to them a range of potential outcomes as represented in the predictive data sets 212 that when populated by the real time interactions between the end user 150 and the agent 170 best match the circumstances of that interaction. This approach enables the agent 170 to have available to them the most likely representations of the set of interactions for a particular product and/or service.

In many circumstances a service journey for a product and service has been defined as part of the development processes. These service journeys may be used, at least in part, to form a digital twin 210.

In some embodiments, if a service journey has not been previously defined, one or more digital twins 210 may be trained on the one or more end user service interactions, for example those based on transcript, using for example one or more machine learning modules 214.

Machine learning, a subfield of artificial intelligence, may focus on computer algorithms that use computational methods to "learn" information directly from data, without relying on predetermined equations, instruction sequences and/or similar deterministic specifications. Machine learning algorithms may work in a way that allows them to improve their performance as the amount of data available for learning increases. One approach is the use of artificial neural networks (ANN), which are computer systems that are designed to simulate the workings of the human brain by modeling the way neurons process and transmit information. In some embodiments, an artificial neural network is made up of a set of nodes, where each node can accept multiple data inputs to produce at least one data output that represents a summary of the weighted inputs. These nodes are interconnected in a layered topology, where the outputs of one layer of nodes are fed as inputs for the next layer of nodes. Artificial neural networks may have other topologies and the way each node combines its data inputs to generate a data output may vary as well.

Learning in an artificial neural networks-based machine learning system may involve adjusting the weights applied to every input and the output threshold of every node to improve the results of the overall output of the network. Approaches to learning in these systems are usually categorized as supervised, unsupervised and reinforcement learning. Each method may be suited to a particular set of applications.

Supervised machine learning methods implement learning from data by providing relevant feedback. This feedback can be in the form of metadata, including, for example, labels or class indicators that are assigned to input data sets. For example, if an end user 150 has an issue with a specific product and/or service, for example a fault or query, this may have a classification assigned to it, where such classification can be in an arrangement such as an ontology, taxonomy or other organization. Input data and any metadata or output mapping can be in the form training data. The goal of supervised machine learning is to build models that generalize from the training data to new, larger, datasets.

Supervised machine learning is well suited for use on classification, which refers to predicting discrete responses from the input data. For example, whether an access event can be matched, in whole or in part, to an existing pattern of end user 150 interactions. Supervised machine learning can also be used on regression applications, where the system predicts continuous responses from input datasets.

In some embodiments the selection and deployment of a set of digital twins 210 may be determined, at least in part, to simulate or model behaviors and ascertain predictive traits using machine learning in a directed manner. This can include the use of one or more predictive data sets 212 for establishing outcomes based on the determined variations of the digital twins 210 configurations. For example, there may be specifications of the degree of permissible variation in differing contexts for a given/desired/intended/predicted outcome (inc. sets thereof). This can include system derived pattern detections for outcomes that indicate compliance variations which are in whole or in part determined through the use of machine learning techniques.

Unsupervised machine learning methods, on the other hand, do not require any labeled training data. Instead, they rely on the data itself to identify patterns and relationships. These methods are useful for identifying hidden patterns and/or intrinsic structures in the input data. Unsupervised machine learning is often used to cluster data points together, based on one or more common characteristics. For example, identifying the end user 150 communications as the access event unfolds. Clustering based on unsupervised machine learning systems can also be used in some embodiments to identify outliers. For example, when an access event involves communications between an agent 170 and an end user 150 that are outside a normal interaction, a demand may be detected to deploy other resources and/or change the agent 170 involved in the interaction.

Machine learning-based clustering can also be used in some embodiments to identify patterns within a digital twin 210 representing an access event involving one or more products and/or services. For example, such a system can be used to identify associations between different combinations of datasets representing end user 150 inputs, states of the one or more products and/or services, including for example any error messages, actions and/or environment states.

In some embodiments, another machine learning set of methods includes reinforcement learning, which, as with supervised machine learning, uses feedback mechanisms. In reinforcement learning, however, the feedback is presented in the form of a general reward value for the generated output, instead of a set of the correct output dataset. The machine learning model is usually trained with a series of trial-and-error repetitions until it can resolve each case correctly. This approach is useful for training systems to make decisions to achieve a desired goal in an uncertain environment. In some embodiments this machine learning method can be combined with one or more digital twins 210, where they are operated multiple times and the machine learning system gets trained to generate the appropriate response, in the form of a decision dataset.

An aspect of this approach may be identifying the real or potential unintended circumstances, behaviors and/or outcomes, where for example reconciliation of the data sets provided by the one or more end users during one or more access events and the machine learning generated data sets, both potentially represented by one or more digital twins 210, can give rise to evaluations and reconciliations that identify such circumstances, behaviors and/or outcomes.

One application of directed machine learning is identification of derivations and construction of new patterns derived from access event interactions, including those represented by operating and simulated digital twins 210 that match one or more characteristics of the context of the access event and potentially end user 150 and/or agent 170 behavior variations.

In some embodiments tokens may be used as a form of transactional value, for example in the form of gamification of the service operations for both agents 170 and potentially end users 150. One current limitation of many service operations is lack of understanding of the knowledge of the end user 150 in regard to their specific product and/or service.

One approach to this is the use of tokens which may be issued to an end user 150 as representing the degree of expertise and/or experience that the end user 150 has with the product or service. In this manner an agent 170 may be made aware of that end user's 150 experience and/or expertise without any PII information being made available to the agent 170. This can be particularly valuable to the end user 150, the agent 170, and the provider 160 where, for example, an update to a product and/or service has been released which has created unintended consequences. In this manner the more experienced end users 150, that is those with tokens acknowledging such expertise, may, in collaboration with one or more agents 170, be instrumental in identification of such unintended consequences, leading to early remediation.

The same approach may be used for agents 170 (human/machine) that may earn tokens as acknowledgements of, for example, expertise with one or more products and/or services, solutions to one or more problems, end user 150 satisfaction, though for example feedback questionnaires, and/or other metrics.

In some embodiments, digital twins 210 may be employed to train both agents 170 and/or machine learning modules 214 in any arrangement. For example, sets of transcripts may be used as the training data for machine learning modules 214 where, for example, PII tokens have been replaced with tokens representing end user 150 situations without any identifying data. In this manner a human and/or machine/AI agent 170 may encounter simulated access events to gain knowledge and skills without disclosure of any PII.

Figure 3:
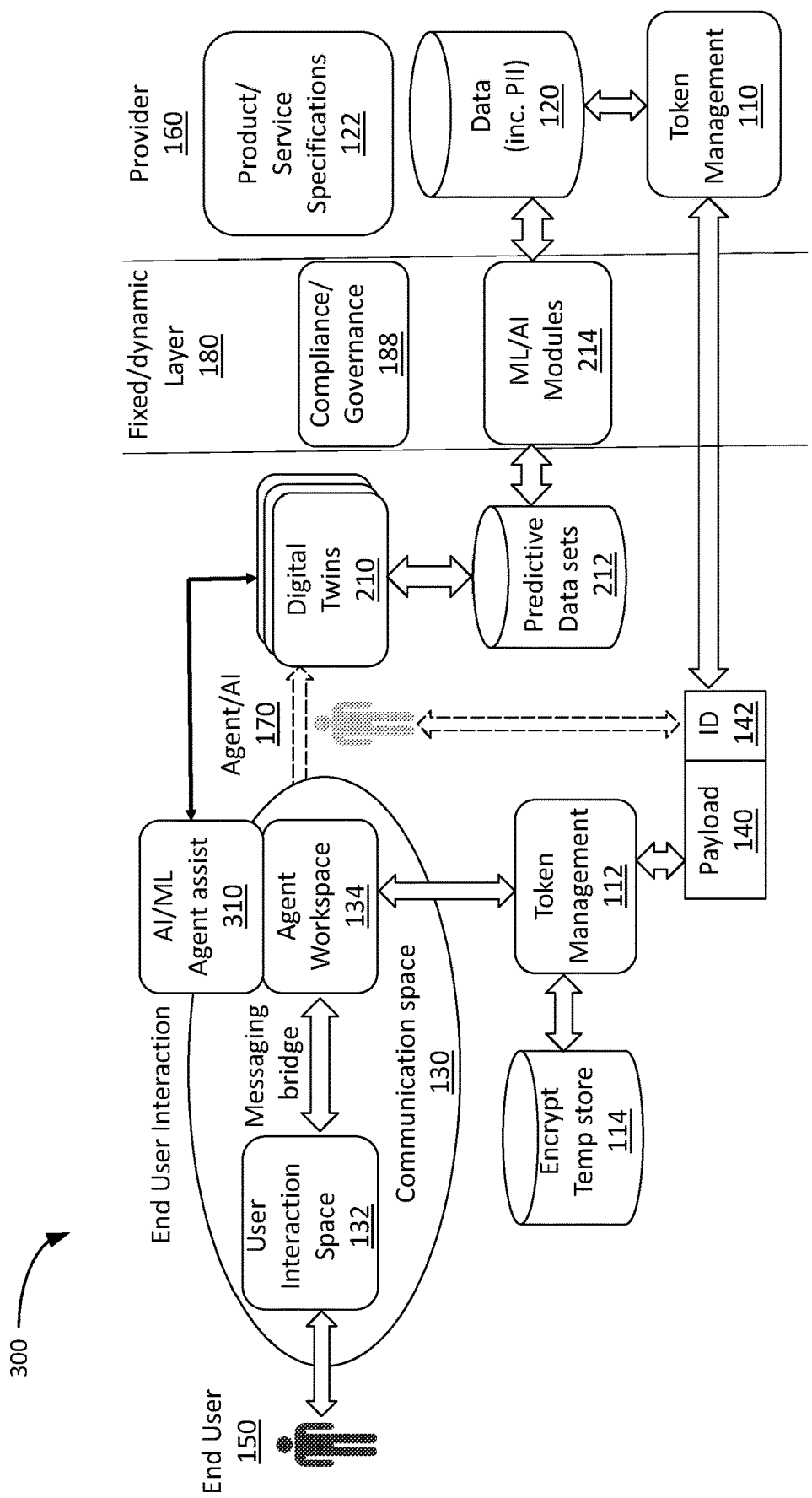
FIG. 3 illustrates an example access event with agent assist, according to example embodiments of the present disclosure.

FIG. 3 illustrates an example access event 300 with agent assist 310, according to example embodiments of the present disclosure. The effective application of generative artificial intelligence (AI) in the domain of end user service provision has several possibilities, including for example, providing a human end user 150 service with an AI assistant 310 that can monitor the interactions of an agent 170 and propose suggestions to that agent 170 for inclusion in their service interactions. This can include the use of large language models (LLMs) on publicly available data sets, for example to identify and propose common fault finding or rectification operations. A version of generative AI may also be trained on the provider's 160 proprietary data sets 120 and the data sets of the end user service organization that involve the provider's 160 products and services to generate assistance for the agent 170 that is specific to a product or service that is the focus of the interaction. This can encompass detailed technical, process sets, rule sets, regulatory data and other data that is pertinent.

In some embodiments such an approach may be embodied as a facility available to an authenticated end user 150, such that they may benefit from self-help in place of an initial service interaction. For example, this can involve the use of voice, displays, text and/or immersive environments.

In the same manner as with an agent 170 of an end user service operator, the communication of this data to an end user 150 may involve the use of tokens, potentially involving a system or device that is registered to that end user 150. For example, an end user 150 may have a smart phone with an application on that device, which when interacting with a service, using for example voice, text, and/or video, may be cryptographically identified and as such data relevant to the interaction can be made available to the end user 150 on their device.

In some embodiments, this data, in the form of a token, may have one or more constraints, including but not limited to time, location, and/or presence of an authenticated end user 150, such that the availability of the data of the token is managed in accordance with these constraints.

In some embodiments, an AI may operate with differing personae for differing agents 170 or groups thereof. For example, the AI may be configured to have a more interventionist approach when involved with agents 170 that have limited skills or knowledge in a particular domain. For example, the AI may provide data sets to an agent workspace 134, including through audio, for example an agent 170 headset, which, at least in part, directs an agent 170 towards a solution strategy for that access event. This can include, for example, directing the agent 170 to ask a set of questions that are not a typical script and are specific to the particular access event of the service journey and the one or more agents 170 involved.

In some embodiments, a symbiotic relationship with one or more agents 170 may be developed with the AI building trust with the one or more agents 170.

There are several considerations in the deployment of AI systems for end user service operations, where such AI may include, for example, generative AI, neural networks, deep learning, and other similar technologies. For example, a constraint for current generative AI models is a limitation of the number of tokens that can be processed simultaneously. This can result, for example, long transcripts with access events being truncated, which results in loss of context leading to inaccurate results.

When personally identifiable information (PII) is revealed during an access event interaction, this data may form part of the transcript, and subsequent processing, for example when communicated to one or more cloud-based systems, can create a potential breach of privacy principles. However, in some embodiments transcripts may be redacted and/or have references to the tokens used in place of the PII forming part of the transcript. In this manner the full access event can be replayed, for example to an agent 170, manager, or other authorized entity without the PII being held in the raw transcript.

A further concern is the maturity of current AI systems and those of the foreseeable future, in that the development of the techniques and their application is under near constant acceleration. This can have a significant impact on the deployment and management of these systems and the supporting policies and procedures.

In some embodiments an agent 170 may be either an authorized human, an artificial intelligence/machine learning (AI/ML) module 214 and/or a combination of both. Arrangements of agent 170 AI/ML modules 214 may include static and dynamic arrangements, for example where an AI/ML module 214 is configured with a specific set of expertise that can, upon one or more criteria, be made available to an agent 170 to at least in part, assist that agent 170 in the resolution of an access event. In this example the AI/ML module 214 may be represented by a query response arrangement and/or may actively intervene with data sets for the agent 170, including for example variations and/or suggestions as to the interactions with the end user 150. For example, if the agent 170 is following a scripted interaction, the AI/ML module 214 may vary the script dynamically to assist the agent 170, who for example may not have sufficient familiarity with the issue at hand.

The AI/ML modules 214 can, in some embodiments, be initially deployed, for example where the communications is initially instantiated through text and/or chat. In this example the AI/ML modules 214 will have access to the one or more tokens that include the relevant PII, however the same constraints that are placed on a human agent 170, for example time limited access to certain data, may also be employed.

The AI/ML modules 214 may use one or more classification schema on the training data to create one or more categorizations of the issues raised by end users 150 during access events. For example, although such an AI/ML module 214 may sue transcripts as training data the PII referenced therein may be represented by one or more tokens. In this manner the AI/ML modules 214 may determine the categorization of the types of issues that end users 150 are communicating to one or more service organizations without being aware of the data in the tokens, however with metadata of the tokens being available. For example, this may provide a first level categorization of issues and/or problems.

In some embodiments this approach may be used for selection of agents 170 for specific access events, for example using criteria other than expertise. For example, an agent 170 with high empathy may be selected for an end user 150 with a history of complex access events, with an AI/ML module 214 proving expertise to that agent 170. For example, one AI/ML module 214 may provide a certain level of expertise to the agent 170 and further act as the representative of that agent 170 in determining for example, which more complex and/or technical data sets may be employed to assist the agent 170 in resolving the access event.

In some embodiments, AI/ML modules 214 may be configured and deployed to undertake feedback operations, potentially dynamically and in real or near real time, so as to, at least in part optimize the operations of the AI/ML modules 214, the agents 170 involved in the access events, and/or AI/ML modules 214. This can include after call work, to analyze, for example, the use of PII and any potential impacts thereof, as well as more typical analysis including but not limited to sentiment analytics.

One aspect of this approach may be the reduction of duplication of access events/end user 150 interactions, such that an agent 170 may have the set of data that represents the most current state of the end user 150 interactions, particularly when those interactions are asynchronous and use multiple communication methods.

Figure 4:
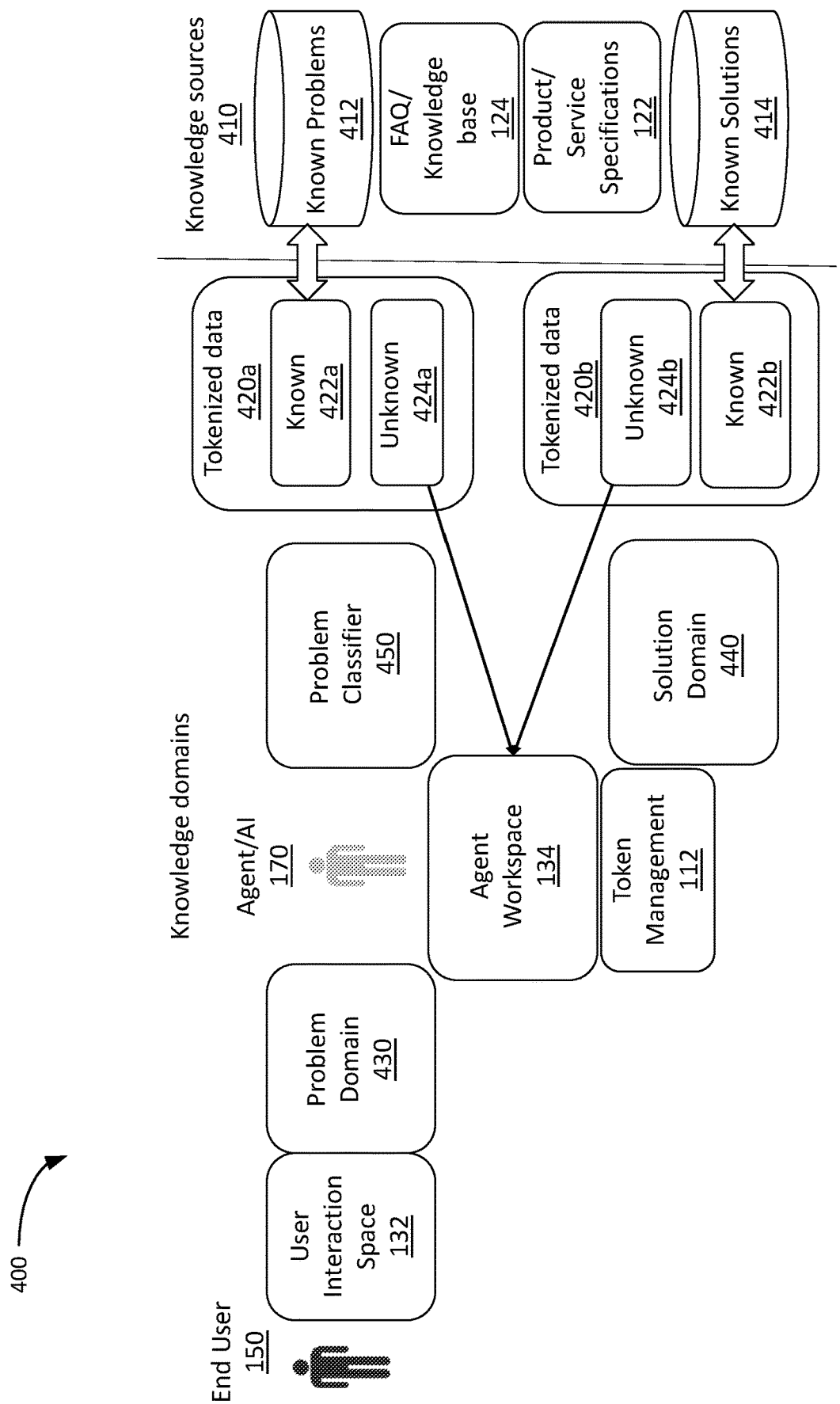
FIG. 4 illustrates an example implementation of knowledge domains, according to example embodiments of the present disclosure.

FIG. 4 illustrates an example implementation of knowledge domains 400, according to example embodiments of the present disclosure. An end user 150 interacts with an agent/AI 170 via a user interaction space 132. Data from the end user 150 regarding a reason for an access event is categorized into a problem domain 430. A problem classifier 450 attempts to use this information to determine a nature of the access event. The agent/AI 170 may access, via an agent workspace 134 in communication with an agent token management system 112 knowledge sources 410 containing a database of known problems 412 and known solutions 414 pertaining to previous access events. The knowledge sources 410 may also contain additional resources such as a general knowledge base 124 and/or product/service specifications. Data from the known problems 412 may be first tokenized data 420a comprising a first known portion 422a and a first unknown portion 424a. Likewise, data from the known solutions 414 may be second tokenized data 420b comprising a second known portion 422b and a second unknown portion 424b. Portions of the first tokenized data 420a and the second tokenized data 420b may be added to a solution domain 440 which may contain a collection of data likely to be related to a solution to the end user's 150 problem.

In some embodiments, events, actions, or other recognizable changes in state of a service journey may be used in any arrangement as part of an identity schema and/or identification process. This approach creates a web of activities, which for example by be represented by, for example an acyclic directed graph or other graph data repository, that in whole or in part, aggregates data usage and/or operations and methods employed for use of such data that can, in whole or in part comprise one or more service journey.

This use of a matrix of data sets with service journeys and the access events they comprise, can create a corpus of data that can be employed to train one or more AI/ML systems to, for example, identify problem domain 430 and solution domain 440 pairings, whilst ensuring any PII is retained by the provider in secure and protected manner.

One aspect of this approach may be the use of ML/AI to provide support to the one or more agents 170 involved in the service journey, so as at the earliest possible access event in that journey provide the appropriate data set to an authorized agent 170 that, at least in part, contributes to the successful resolution of that end user's 150 problem.

Token management systems may include tracking and tracing of the distribution of tokens generated, such that the state of PII available to any one or more agents 170 can be monitored. For example, if multiple agents 170 are requesting and/or being provided PII for an end user 150 this may indicate a problem. Token management systems can be invoked by, for example one or more provider systems and configured to create tokens on demand and/or in anticipation of one or more agent 170 requesting such tokens. In some embodiments one or more AI/ML systems may be employed to predict the likely requirements for one or more agents 170 in one or more access events. This can include prediction of the PII to be provided to that one or more agent 170 and the most effective and efficient segmentation of the data set to be provided, so as to minimize the potential for PII leakage and support the agent 170 in providing the end user 150 with an efficient resolution to the access event. This can be particularly the case in asynchronous access events where multiple agents 170 are involved, potentially requiring each of those agents 170 to access sufficient history of the previous access event and their potential demand to have further end user 150 data, including PII be available to them to effectively resolve the access event. In this manner the token management systems may retain the history of the tokens provided to such agents 170 and many be configured to create one or more tokens dynamically for the support of that specific set of access events.

In some embodiments, the use of logic trees and nodal structures for traversing data sets based on tokenized data arrangements may be employed. For example, using one or more classification schema, sets of tokens may be grouped so as to provide a structured data set that can be sued by one or more agents 170 in response to one or more access events. For example, taxonomies, ontologies, graph data bases may be employed, to at least in part, provide a navigation structure for the one or more agents 170. The token management systems may incorporate one or more monitoring systems that retain and evaluate the navigation of such arrangements by the one or more agents 170 to potentially in collaboration with one or more machine learning/AI module, provide the agent 170 with an optimized arrangement of such tokens.

For example, such an approach can include default data sets based on one or more products and/or services and may in some embodiments include known previously identified problem sets and their solutions. For example, typical end user 150 environments may be represented, for example in one or more digital twins. In some embodiments one or more versions of a product and/or service-development test framework may be instantiated as a set of tokens representing the data thereof.

In some embodiments a token management system may be employed to manage context for the one or more end user/agent interactions through the provision and monitoring of the supply and/or use of one or more tokens, where such tokens may include, at least in part, end user 150 PII. For example, this can include multiple verified identities, multiple time periods, sequential/asynchronous communications and/or interactions, one or more verified end user 150, one or more verified product/service pertaining to that end user 150, one or more provider data set, one of more verified provider system, one or more trusted verified time source, one or more verified repository in any arrangement.

One aspect of the token management systems may include the capability for the token management systems to track and trace the tokenized data made available to one or more agents 170. For example, this data can be transferred securely in tokenized form and may include data and/or rights to further data, where for example, such rights may be context dependent and may include the use of remote configurations instantiated as tokens.

In some embodiments, token management systems may manage the creation and/or distribution of tokens that have limited time availability, configured as time windows, for example with parameterizations where functionality and/or data accessibility is only available for specific periods of time.

In some embodiments there may be multiple communication methods and links to persistent workspaces, for example those of an agent 170 in one or more service operations, where for example in an asynchronous environment, such as when there is a follow the sun end user support operation, tokens may be used as a repository for data sets generated in such workspaces when end user services are active. These tokens may be created by suitable configured instances of one or more token management systems.

In some situations an end user 150 may have multiple product and/or service relationships with a provider, for example they may have a number of financial products or services and/or physical products, for example computers and/or phones. In this example, the end user PII may comprise multiple data sets pertaining to each of the products and/or services. These data sets may be, for example organized in one or more provider repository. The use of tokens to segment the data sets in support on the one or more agents engaged in in access events for each of the products and/or services can provide appropriate access to end user 150 data, and any PII in a manner constrained by the data segmentation. Additionally, the token management systems may retain the relationship between these access events and the end user 150 data so as to enable a holistic view of interactions with a specific end user 150.

Figure 5:
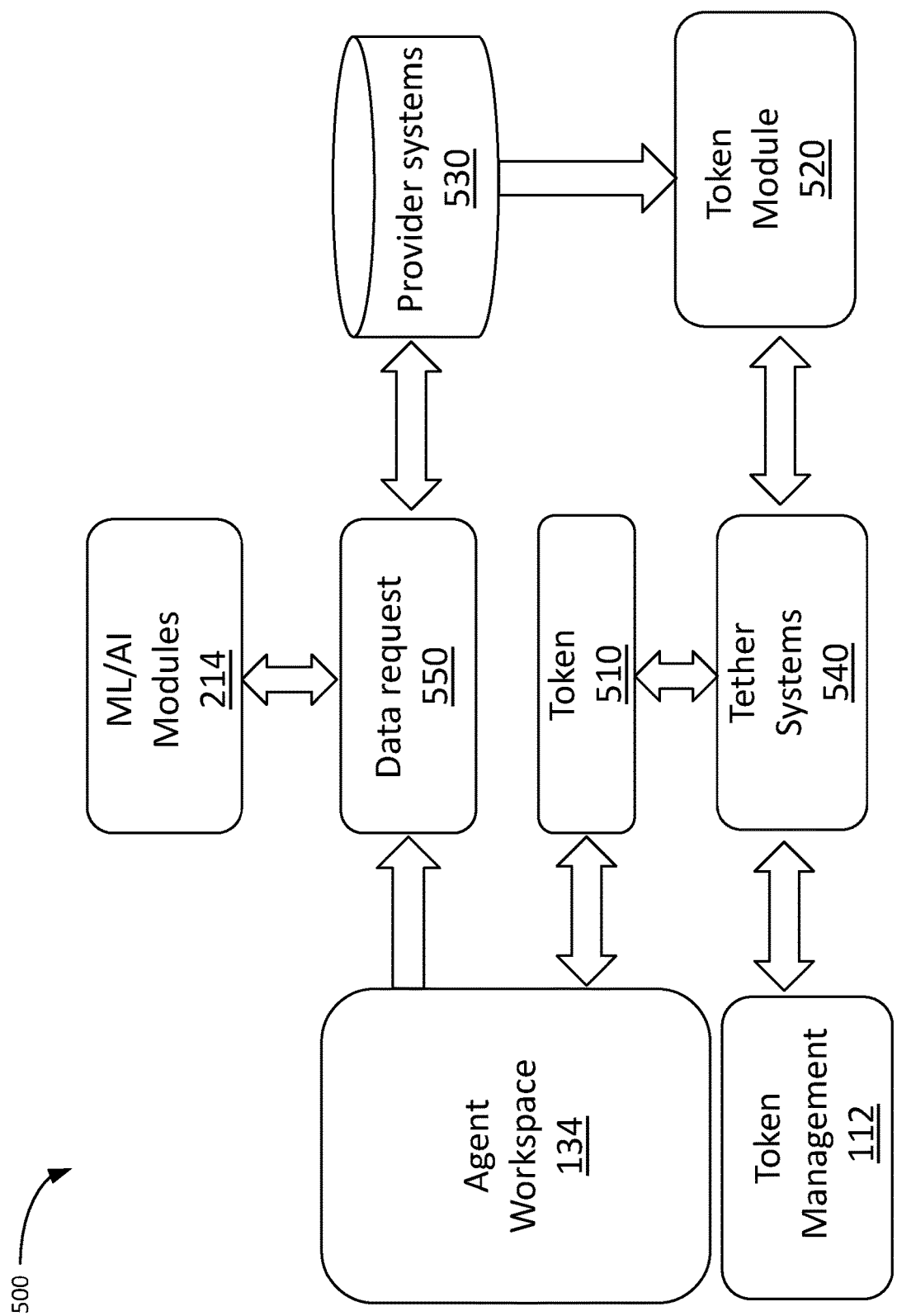
FIG. 5 illustrates an example system for providing tokens to an agent, according to example embodiments of the present disclosure.

FIG. 5 illustrates an example system 500 for providing tokens 510 to an agent, according to example embodiments of the present disclosure. A token 510 may be created, for example, by one or more provider systems 530 in advance of and/or in response to one or more interactions by an end user service system and/or the agents or representatives thereof. This token 510 may include one or more segments that can be used to retain a relationship with the provider systems 530, and/or their proxies, that originated the token 510. This can include, for example the use of synchronous technologies such as, but not limited to VPN's and asynchronous technologies such as, but not limited to timers and/or counters, cryptographic keys, event and/or action detection systems.

An agent, via an agent workspace 134, may send a request 550 to a provider system 530 for the token 510. The request 550 may be sent and/or received by an ML/AI module 214, which may be an originator of the request 550, as opposed to examples where an agent is the originator.

This retention of the relationship between the provider data systems 530 and the service systems can provide several token management 112 arrangements, where the control and access of the data is managed by the provider in the context of the interactions of the end user service systems and their agents and the end user.

In some embodiments there may be a tether module 540 that is configured to control the token 510 and the availability of the data of that token 510. For example, a token 510 may comprise a set of segments, each of which includes one or more data sets and can be encrypted. The tether module 540 may communicate, including the use of secure channels with the provider, either directly to one or more services managed and/or controlled by the provider and/or through the configuration of the tether module 540 as specified by the provider.

This approach ensures that the data provided by the provider is only available to the end user service operations, including human or machine agents for the purpose of one or more end user interactions. This can include the configuration of the token management systems 112 deployed at the end user service systems and/or at the provider, where such modules may include the tethering capability.

In some embodiments, when a token 510 is determined to be unavailable to the end user service operations and/or agents thereof, the token management system 112 may make that data unavailable, delete the token 510, and/or overwrite the token 510. In some embodiments, the token 510 may be connected to a tether system 540 and may receive instructions as to the availability of the token 510, for example in the form of a hash, cryptographic key and/or other secure communications, for example on a periodic, event and/or action basis. In this example if such communication is not received in the manner that matches a token 510 configuration, then the token 510 will not provide access to a payload data. In some embodiments this may involve the use of one or more hardware enabled secure enclaves, such as those instantiated by ARM, Intel, and others.

In some embodiments, a token 510 can be tethered to the originating source, for example the source of the data, such as a provider repository 530 and provider token management system 520. Such tethering can be asynchronous or synchronous and can include one or more connections to the origination point using a range of cryptographic and other techniques, for example, using primes that when received enable one or more agent, with an authenticated identity, access to, in whole or in part, the data payload of token 510.

For example, if such a communication is not received, the token management system 112 and/or the token 510 itself may take measures to make the data payload of the token 510 unavailable, through for example, using access controls, temporal data, or other techniques, including but not limited to overwriting the token 510, changing the key or tether to the token 510, and/or encrypting the token 510 further.

Inherent in any system for effective management, distribution, tracking and/or tracing of any data sets are the authenticated identities of the one or more entities involved. This can include authorization, authentication and/or access controls in any arrangement. For example, an end user service agent may be authenticated by the end user service operator, and such authentication may be made available to the provider systems so as to ensure that data from provider systems can only be accessed by authorized agents.

One challenge is that there may be many agents, with differing schedules and shifts, that may interact with one or more end users over the lifecycle of the end user service journey. Such agents may include non-human actors, such as AI chat bots and/or AI agents that may operate with and/or in place of human agents in any arrangement.

Figure 6:
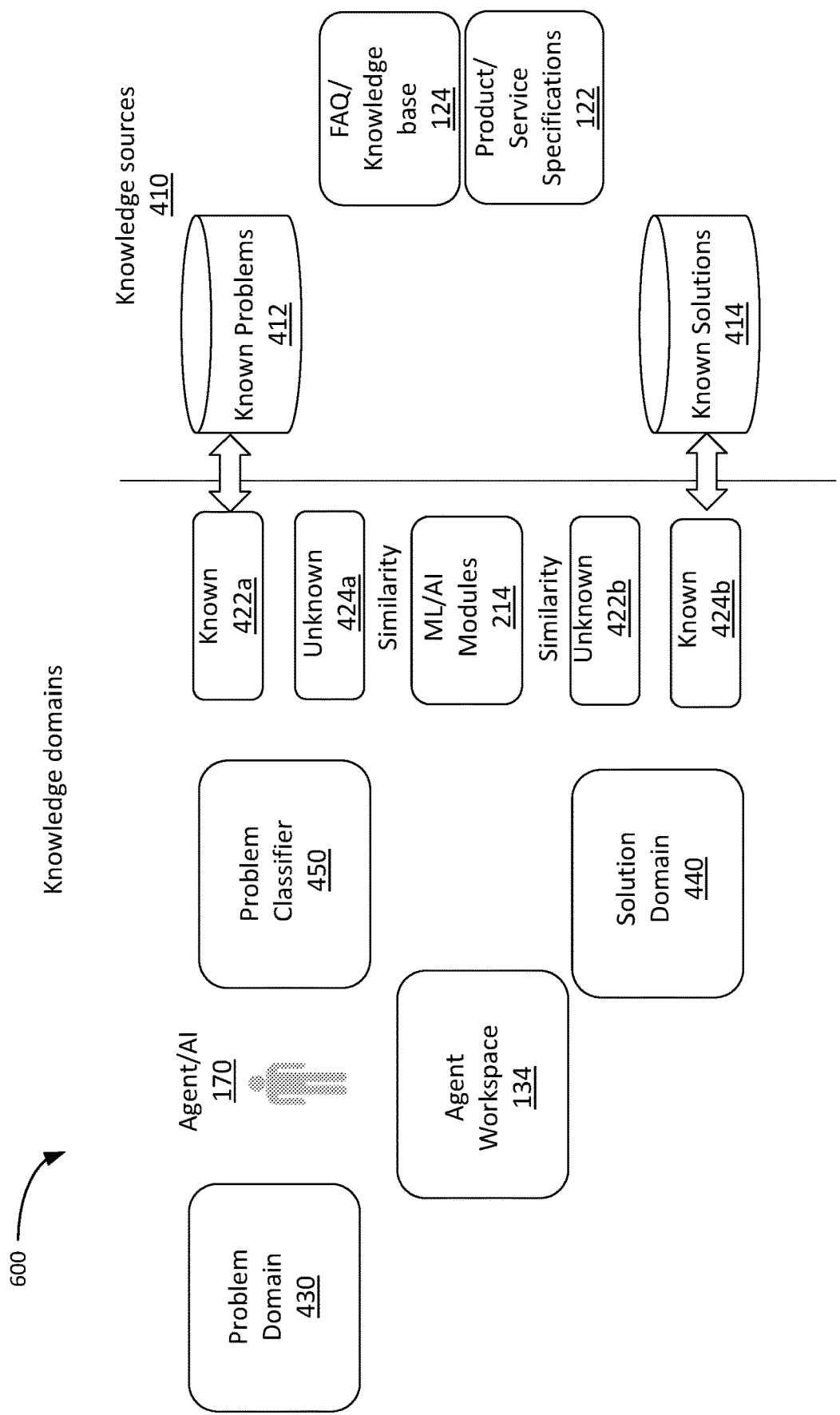
FIG. 6 illustrates an example organization of data in a computerized information access control system, according to example embodiments of the present disclosure.

FIG. 6 illustrates an example organization 600 of data in a computerized information access control system, according to example embodiments of the present disclosure. The organization of FIG. 6 is laid out very similarly to that of FIG. 4, however the system of FIG. 6 leverages machine learning/artificial intelligence (ML/AI) modules 214 to categorize data. By determining a similarity between a first unknown data 424a and a second unknown data 424b, the system of FIG. 6 may reach a useful conclusion of an access event more quickly than it would otherwise, improving the efficiency and performance of the system.

Figure 7:
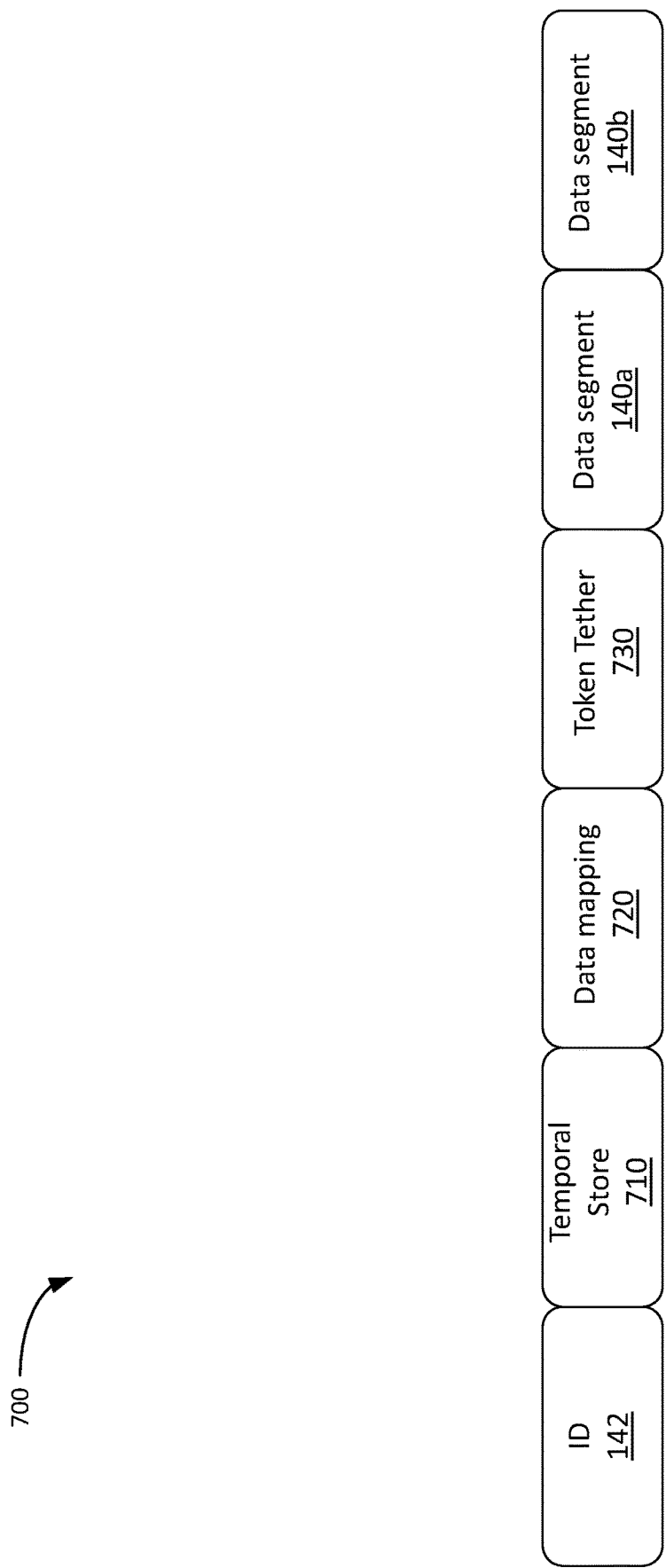
FIG. 7 illustrates an example token, according to example embodiments of the present disclosure.

FIG. 7 illustrates an example token 700, according to example embodiments of the present disclosure. The token 700 contains an identifier 142, a temporal store 710 indicative of a time constraint on the token's 700 availability, a data mapping 720 indicative of sizes and locations of segments within the token 700, a tether 730 indicative of a source (and possibly a time interval) of expected communications from a source token management system, a first data segment 140*a*, and a second data segment 140*b*. It will be appreciated that actual embodiments of the present disclosure may include many additional data segments or fewer data segments, and that any given portion of the token 700 may be excluded in a particular embodiment.

In some embodiments, tokens 700 may include sets of data that can be accessed by one or more authorized entities, for example, one or more agents. Each of these data sets may have In some embodiments, on the initiation of an end user service interaction there can be a set of tokens generated by the provider systems that are dynamically communicated to an agent in an end user service organization. For example, such a token 700 may include sufficient information for an agent to identify the end user, which may include biometrics, confirmation of multi factor authentication, and/or query-response interactions.

When the authentication is complete such a token 700 may be disabled, such that no information remains on the agent workspace and, in some embodiments, a token 700 may be generated by the agent workspace and/or one or more secure proxies, to confirm to the provider systems that such authentication has been successfully completed.

The end user may then initiate their end user service journey, if that is their initial interaction, which can involve initiating an access event, in which the details of their query are described to the agent and the end user service systems supporting the agent. This can, in some embodiments, include one or more AI and/or machine learning systems, which may, in whole or in part, assist in the classification of the end user query, for example determining that the query relates to a specific product and/or service.

Tokens 700 may be generated dynamically by, for example, the provider system, in advance of their distribution to one or more endpoints, for example one or more agents involved in an end user support journey. The prediction of data sets for an end user service access event may use one or more ML/AI systems, based at least in part on training data from previous end user service journey access events.

In many cases these dynamically generated tokens 700 can only be made available to one or more agents during the period when they are involved with an end user service interaction. This can include the use of time-based windows, in that when an agent workspace initiates an access event with an end user as part of their end user service journey, one or more tokens 700 is made available to that agent for the period of that interaction. When the access event has concluded, the token 700 data segments 140 become unavailable to one or more agents.

The use of the token 700 data segments 140 can, in some embodiments, result in a transcript that includes at least in part, data segments 140 from the one or more tokens 700 that have been accessed by the one or more agents during the access event. These data segments 140 can include directly or indirectly end user data as part of that transcript.

In some embodiments, such end user data which may directly or indirectly, by reference and/or embedding include PII, may be extracted from a transcript before that transcript has been communicated from the end user service agent workspace, and in whole or in part be tokenized and/or reference already existing tokens 700, including those that have been provided to such end user service agent as part of the end user service access event.

The transcript may then be communicated to one or more cloud processing systems with embedded references to the one or more tokens 700 representing any PII.

These operations may be undertaken by one or more token management systems responsible for generating and managing tokens 700.

In some embodiments, this data may be recognized as having originated as part of one or more tokens 700, and as such the data may be represented in an agent workspace in a manner that includes one or more sets of metadata designating that token data as, for example, containing at least in part PII.

In some embodiments an agent workspace may persist the meta relationships of the token 700 access, without retaining the data that is held by the token 700. Such metadata may be retained in one or more repositories, for example, one or more distributed ledger.

Token 700 metadata may be organized, for example, in the form of a taxonomy, ontology and/or other arrangement where differing data sets may have differing metadata, for example designating, differing levels of sensitivity of the PII, if such PII forms, at least in part, an element of the access event. The token 700 metadata may include, for example, the relationship of one or more tokens 700 with other tokens 700. For example, if an end user PII data set comprises, for example, static data such as name, address, age, and one or more sets of dynamic data, such as transaction history, credit scores, purchase history, and/or end user service interactions, these tokens 700 may have meta data that, at least in part, describes the data comprising such tokens 700.

In this manner an agent may become aware of the arrangement of the data comprising the PII, without access to the underlying data. For example, if an agent, having in authenticated an end user in the approved manner for the provider and the end user service organization, within the context of an end user service access event, determines that, for example, certain transaction information should be supplied to resolve the access event, they may access the metadata arrangement, for example represented as a graph, and select those data sets they require to resolve such access event. The system may then determine whether to provide such tokenized data to that agent and configure the tokens with the appropriate temporal or other data.

In some embodiments, the representation of the tokenized PII may be informative as a generalized representation, and the actual tokens 700 comprising the PII may be dynamically generated in response to the actions of the agent, within the context of the current unfolding end user service access event.

In some embodiments the provider may have pre-segmented the end user PII and provide these tokenized representations in a fixed manner.

Tokens 700 can include multiple data segments 140, where for example, one or more data segments 140 held, for example, by a provider in a secure data repository, may form part of a token 700 communicated to one or more agents, either through reference and/or embedding. In some examples, this can include communicating a further token 700, as the data segments 140 of the initial token 700, where such a second token 700 represents data that is held by such a repository. In this manner the second token 700 may provide the underlying data depending on one or more triggers from the interactions of one or more agents in an access event with an end user.

Such triggers may, for example, be based on words and or phrases that an agent and/or end user express during an end user service access event or even sentiment or tone of voice. The token management systems, in combination with one or more ML/AI systems, for example using NLP, may detect the occurrence of one or more words and/or phrases and can access the one or more data segments 140 held by the second one or more tokens 700.

In some embodiments, the interactions of one or more agents interacting with an end user in an end user service access event, may be evaluated by one or more ML/AI systems to extract, at least in part, topics, phrases and/or other communications.

The availability of data segments 140 comprising, at least in part, PII or other information that a provider has identified as confidential, can include one or more temporal characteristics, such as timed availability, duration of availability, synchronization with one or more temporal aspects.

For example, data segments 140 may be constrained in terms of their deployment, for example they may only be available at and/or for specific time periods. For example, data segments 140 may only be available during the hours of operation of an organization's published operating hours, that is when end users can communicate with that organization. This may include, for example periods of time in advance and post this availability so that agents may prepare or return the data. In some embodiments, a set of data may only be available to one or more agents for specific periods of time, for example a duration of one hour, where at the conclusion of the duration the data ceases to be available. In some situations, there may be mechanisms to extend this duration at the request of one or more agents, with an appropriate audit trail for such data use being employed. This can include the use of tokens 700, whereby the token 700 will only make certain data available within a certain time-period.

A further temporal set of characteristics may involve the synchronization of a set of data with one or more agents and an end user service journey comprising one or more access events. For example, if an end user service journey has been initiated and instantiated as a first access event of that journey, one or more sets of data may be provided to the agent involved in this instantiation. This data set may include provider end user data intended to enable the agent to address and resolve the end user query. This data set may, for example, include data on or about that end user, data regarding the product and/or service that the end user has transacted for and/or other data segments 140 that are pertinent to resolving the end user service journey in a successful manner. In this example, this may involve three tokenized data segments 140, the first being the provider end user data, the second being the data of the product and/or service and the third being other data of the provider. These three tokens 700 may, in some embodiments, be formed into a framework of relationships, for example as a node on a graph database, such that at the conclusion of this initial access event, the use of these specific data sets represented by tokens 700, is recorded in a repository.

If, for example, this access event did not successfully resolve the end users service journey and further communications with the end user service organization is undertaken, the data segments 140 represented by these tokens 700, in combination with the record of the first access event should be available to the agent that is tasked with interacting with that end user. This involves synchronization of the data segments 140, which can be represented by one or more tokens 700, which are configured for the continuing end user service journey as part of a second access event and provisioned to the agent designated for that access event.

In some embodiments, a provider service may create new tokens 700 for that provisioning the second access event, in part to ensure the security of the data included in such tokens 700. Some providers may encapsulate the first tokens 700 as a segment in further tokens 700, for example through aggregation of the original tokens 700 of the first access event being combined into a further token 700 where each of the first tokens 700 is a segment in the second token 700 as is the record, including any transcript, of the communications with the end user in the first access event.

In some embodiments, one or more tokens 700 may be deployed to synchronize one or more end user service agent workspaces, where for example such workspaces are enabled to engage with one or more end users in an asynchronous manner. For example, certain workspaces, agents and/or other end user service organization arrangements may be enabled to support one or more specific provider and/or provider product and/or service end user support operations. In this manner only specific end user service organization arrangements may be able to support the specified provider enabled products and/or services.

Such tokens 700 may also be deployed so as to enable one or more communications with one or more end users across multiple communication methods. For example, a token 700 may enable the use of communications using text on smart phones through the end user service agent workspace only and/or may restrict the use of communications to one or more specific communications types, such as voice only.

In some circumstances the time-period may be determined by the operations of one or more end user service agents, such that the data is available for a time window, where that window commences on the initiation of one or more thresholds, events, actions and/or triggers and is curtailed on further actions, events, triggers and/or thresholds. This can include one or more specifications that enable the originator of the data to cancel access to the data based, at least in part, on circumstances that are apparent to the controlling entity independent of the end user service provider and/or the agent thereof.

One potential aspect of embodiments of the present disclosure may be the use of one or more machine learning systems to establish, for example, one or more representations of the data sets managed by the provider related to their products and/or services. This can be in the form of creating a corpus for the machine learning systems to operate on employing, for example neural networks, Generative AI, and other appropriate techniques to create one or more representations that are suitable for navigation by one or more end user service operations for the purpose of supporting such products and/or services of the provider.

There are a number of operations by an end user service center that can be supported and enhanced by the systems described herein. This includes the categorization of the end user service interaction, the provision of the relevant data to one or more agents interacting with an end user, including in an asynchronous manner across multiple time intervals, resolution of an end user service interaction in an efficient and effective manner, from the perspectives of the end user, end user service operator and the provider, protection of the PII of the end user data as managed by the provider and/or the creation of data systems that support the provider operations and/or end user service operations in any arrangement.

Within any end user interaction there are data sets that are pertinent and currently handled by existing systems to various degrees of efficacy, for example, the identity of the end user and method of communication. These interactions are often recorded and transcribed to text providing a record of the interaction.

These transcripts can, in some embodiments, form a corpus for operations of one or more AI and/or machine learning systems to, at least in part, create a set of categories that represent those interactions. This can include summarization of those interactions, to provide a further data set that may, at least in part, form a knowledge base for use by the end user service operator and/or the provider.

Some of these AI/ML operations may include, for example, use of NLP and/or computational linguistic techniques, such as sentiment analysis, statistical semantics, deictic and other dereferenced terms, inference, knowledge extraction, and disambiguation. This can include, for example, the use of Large Language models, such as those trained on public data sets, and versions of LLM's that are trained on private data sets, such as the transcripts of end user service interactions, creating Private Large Language Models (PLM). In some embodiments, one or more ontologies and/or taxonomies may be deployed in combination with the AI/ML categorization to form, for example, a graph-based representation of these categories.

The use of summarization, especially when an AI model is deployed, can result in the summary being so generic as to not be of use. Exception based summarization involves creating a "generic" summary using a standard AI LLM tool, similar to chat GTP, and then using a more aggressive model trained specifically on call transcripts to identify exceptions, that highlight the specific attributes of the call that differ from the general transcripts in similar call interactions. This can provide a data set that represents a summary of aspects of the call.

The use of generative AI for summarization and categorization, can be employed with either LLM's or PLM's, where the LLM or PLM is configured to provide, for example, a summary of the interaction, an exception based report highlighting problem areas of the interaction, for both end user and end user service agent, a data set suitable to be embodied in a knowledge base and/or a set of data sets, one or more data sets representing such interactions that can be stored in one or more distributed ledgers, one or more data sets suitable for representation as suggestions for other end users and/or end user service agents in any arrangement. Metrics for evaluation of human supervisor accepted (HAS) accuracy may include but are not limited to accuracy, truth, redundancies, level of detail, and scope for further summarization.

In some embodiments, one or more data sets may be provided to end user service systems, including the agents thereof, to provide data pertinent to the end user service request being undertaken at that time. An aspect of this may be the handling, by such an end user care system, of the data provided by one or more provider data systems, including any PII.

The use of tokenized data sets by the provider to one or more authorized end user service agents and their designated authenticated workspaces supports the limitations of the distribution of that data. Each token has one or more segments, one of which comprises a set of timing data. This timing data may be used by one or more processes, including processes initiated by the token, to grant access to the one or more segments of the token.

In some embodiments there can be the creation of one or more dynamic boundaries for the retention of end user specific information, including PII, within an end user service access event. For example, these boundaries are, at least in part, formed by a combination of the data sets authorized for that access event, for example those provided as tokens to the one or more agents involved in such an access event, and the agent computing environment. This use of both tokenized data and workspace environment can enable control of the data, though for example limitations on time of access, granularity of the data, and agent operations on such data, providing sufficient data for the access event in support of the agent engaged in that end user service resolution.

An end user service journey can comprise multiple access events, which may be synchronous and/or asynchronous. Each access event may have a temporal aspect, in that there is a start, duration and end of the access event. During this duration the access event may require provider data sets to undertake resolution of the end user service access event. This data can be provided to one or more authorized agents such that the data is only available to that agent for the period of their involvement with the access event. The agent workspace includes their computing environment, and may include one or more computing hardware platforms. The provision of these data sets may not be contiguous, in that the end user service journey may comprise a set of interactions with one or more agents, which are spread over an extended period.

One aspect of the systems may be ensuring that there is the relevant synchronization of the appropriate data sets for the one or more agents to support the end user service journey.

End user service interactions may be in the form of a conversation, albeit one that is often asynchronous and focused on the initial topic of the end user service. During an access event the agent may handle one or more topics to resolve the end user's enquiry.

Self-Service End User Support

Similar to internet banking, end users securely identify themselves and then establish a support access event. Access events may be evaluated by one or more agents, where access events are classified by one or more machine learning/AI systems and agents with expertise or skills in the access event domain are alerted to that access event and can contribute to resolution.

Tokenization of Data

Data transferred between end points, to enable human interactions, must at some point be in the clear, that is, human readable and able to convey the data that is represented to a human. Even where the data is transferred through secure communication channels, at the end point this data must be able to be understood by a human who is charged with operating on and/or with that data, as is the case of an end user service agent operating in an end user service operation in support of end user service journey and the access events they involve. For example, exposing an end user's home address, age, or marital status on an agent workspace.

The use of tokenization of that data enables a fine-grained control of the distribution of those data sets, such that only the data for the purpose of an end user service access event, at the time that data is made available. The use of tokens enables data sets, which can involve substantial private and confidential information sets, to be segmented into data sets that have a set of relationships between those sets, such that the data comprising those tokens has, for example, an inherent set of relationships. For example, if an end user is enquiring about a bank account transaction, data sets regarding the bank's ATM key management systems would not be needed or required. In this example the data sets, represented by token, would have no relationship and as such any request for such tokens could indicate a security breach. Further, even if the tokens were purloined by unauthorized actors, without the relevant key management system access, the tokens could not be decrypted.

Tokens may have metadata, such as for example the relationship between one token and another, for example if a data set is segmented into a set of tokens, where there is a sequence representing that data set. In this example, each token may, for example, form part of a linked list or other organization, such that each token is made available to an agent is a particular order, for example a sequence.

In many organizations the sets of data to support end user service journeys are well suited to such segmentation and tokenization. For example, end user service queries involving account transactions may be segmented by account and/or time period. In the example of a product, data sets may be segmented by product functions and/or operations. In the context of the present disclosure, a "product" may be any good or service provided to an end user by a provider. An "access event" may comprise the end user contacting the provider for support in relation to a product which the provider has previously supplied to the end user.

In both service and/or product cases, the tokenization of the data sets may be based on one or more use cases, such that each of the data sets may be segmented into multiple, potentially overlapping tokenized representations. For example, in one access event a data set may comprise, for example, a single product function, whereas in another tokenized data set may involve multiple product functions.

The use of tokenization is pertinent to any data that involves PII, in that the token can only be accessed by authenticated entities, including agents, agent workspaces delegated and authorized end user service systems, including authorized agent proxies, for example include machine learning and AI systems. Such access may be restricted to particular time windows and in some embodiments, may require other forms of authentication, including biometrics, fingerprinting of one or more systems, including agent workspaces, presence detection systems, such as agent presence detection and/or end user communication detection.

In some embodiments, the relationships between tokens may be represented in one or more graph databases, including the use of acyclic graphs. In this manner these potential combinations of tokens, representing the segmented data may be maintained, such that traversing the graph may be constrained by the authentication of the entities attempting such traverse and/or by the inherent relationships of the tokens as represented by the one or more graphs.

In some embodiments, one or more machine learning and/or AI systems may evaluate the use of the graphs by the one or more agents and/or their authorized proxies to determine, at least in part any common pathways used by one or more agents, for example those involving a particular product or service and/or those that represent attempts to gain access to tokens that do not form part of the access event currently being served. These evaluations may inform the configuration of the graph-based repository, where for example differing relationships between one or more tokens may be established. In some embodiments, this may involve the creation of further graph-based repositories, where token sets relationships are managed and in some cases specialized for specific end user service journeys and/or access events.

In some embodiments, the set of tokens deployed to one or more end user service agents may have their relationships retained in one or more repositories, for example a graph database. In some circumstances, where for example a particular set of tokens representing a particular set of data is used multiple times in pursuit of resolving a specific end user service query, such relationships and by reference and/or embedding, be configured in one or more smart contracts.

In some embodiments tokens may be used for the communication of data sets from provider systems to the end user service provision systems. For example, a token, which is generally encrypted, can comprise multiple segments supporting the communications of such data.

An aspect of the system may be the tokenization of the provider data to ensure and enable one or more end user service operations to have the appropriate data available for the period in which such end user service operation, including the access events thereof, is being undertaken by the one or more agents involved.

The use of one or more tokens that support and enable segmentation of provider end user data to enable management of the distribution and use of this data within the context of an end user service access event provides a secure and reliable enablement of the protection of PII in the end user service domain.

Data Tokenization

In some embodiments, tokens can be used to communicate data from one end point to another and/or from one system to another. The tokens may be cryptographically signed using one or more well understood techniques.

Each token can have a system wide unique identity and may be created by, for example, a token management module. Such a module may access one or more secure repository, and using one or more configuration specifications generate one or more tokens. This can include generation of tokens dynamically and/or in anticipation of one or more actions, requests, event and/or other triggers.

Tokens may comprise multiple segments, which can have differing configurations of the data included in such segments. This can include, for example, token identity data, meta data, provider supplied data, data referencing other tokens and/or arrangements and/or organizations of tokens.

Tokens may be created by and/or processed by one or more token management systems, where such systems include one or more key management systems that support and/or enable the availability of the data held in the one or more tokens to one or more end points, including for example, end user service agents.

PII Detection

One issue with many current systems is the use of access controls for PII, in that once access has been granted to one or more agents, the totality of the PII controlled by such access control system is available to the one or more agents. This can create situations where an agent has access to data sets that are not pertinent of the purpose of the end user service access event in which they are currently involved. The system described herein uses one or more tokens to represent the data sets to be access by an agent for the purpose of their current client service access event.

In some embodiment an agent may request certain data comprising at least in part PII form a provider repository, so as to provide the appropriate communications in one or more end user service access events. This data may be stored in a repository of one or more provider in manner suitable for distribution to the one or more agents and/or may be stored in manner that is optimized for one or more provider storage systems.

In either case, the data potentially accessible by the agent can be segmented, for example as tokens, that can be communicated to the agent as that data is requested. These tokens may include temporal duration and/or expiry data that, at least in part, controls the access to those segments of the tokens that include, by reference and/or embedding PII.

A watchdog function, which can be embodied in hardware and/or software may operate to evaluate the data sets made available to an agent and, at least in part, identify any data sets that are extraneous to the current end user service access event in which that agent is involved.

One aspect of the system described herein may be the detection of PII that is present outside of the providers secure data storage. For example, when token data includes PII, and the token has a time window on the use of the data and an endpoint of a specific authorized and authenticated agent and their workspace, and that token is managed by one or more token manager, any presence of that token outside of the designated end point could represent a potential unauthorized distribution of the PII. As the token is encrypted, access to the PII and such unauthorized distribution can only occur within the time window of the token and as access to the token is, at least in part, managed by the one or more token managers, the presence of the token can be reported to one or more systems, including for example a further token manager where such distribution is monitored. In some embodiments, a token management system may be configured to delete, overwrite and/or limit access to the one or more data segments of a token, if that token does not comply with the token management systems specifications. For example, if a token has certain meta data indicating a specific end point, for example a particular agent engaged in an end user service access event with a specific end user, and that meta data is incompatible with that situation, a token management system may create one or more alerts and/or restrict or disable access to the one or more data sets of that token.

Data Windows

Often, in an online contact center environment where end users, for example, may engage through social messaging channels such as Facebook or WhatsApp, one or more agents may employ additional data in order to successfully handle end user requests. In order to provide, for example, message thread continuity for an end user over an extended asynchronous conversation period, various data and/or metadata can be stored, processed, and analyzed using one or more algorithms.

This can involve one or more techniques, such as employed in computational linguistic analysis, such as latent semantic analysis, natural language processing, and/or sentiment analysis to establish the baseline of the conversation initially and then subsequently to employ these techniques on an asynchronous basis when the conversation continues. This can involve the management of the techniques employed, their configuration, the state of these tools and the data on which they operate so as to provide a continuous set of conditions for the conversation. This approach can include the analysis of message metadata for continuity in asynchronous conversation threads over extended timeframes. The retention of this data, the state of the conversation, the tools and/or techniques, which may include one or more machine learning techniques, involves one or more repositories configured to support such asynchronous conversations. In some embodiment this can involve one or more graph databases, potentially coupled, directly or indirectly with one or more distributed ledgers.

Similarly, the development of a system to provide sufficient end user data to facilitate successful ongoing interactions between an agent and end user in a real-world environment can be supported in a similar manner.

One aspect of this approach may be the creation of one or more algorithms that, at least in part, identify end users and/or enhance end user details in asynchronous conversation threads. In many circumstances an end user may interact with a number of agents during the resolution of an end user service access event. Typical systems assign a unique code at the initial access event interaction and then build, often from transcripts, a record of the interactions with the end user and the agents. This approach relies on the end user being aware of the unique code as well as all communication sources using that code. Additionally, the data in that access event is often indexed by that code. A more efficacious approach employs the use of segmented and potentially tokenized interactions that can be shared amongst multiple agents without disclosure of any end user PII. For example, if an agent undertakes a certain set of interactions with an end user, which in turn require the agent to communicate with, for example, a further part of the provider organization, then the access event may have state, in that it cannot be completed until this has occurred.

In some embodiments, access events may be stored, in whole or in part, in one or more repositories, where those access events have state. This can include sets of dependencies that, for example, close an open access event and/or initiate a further access event with one or more end users.

Each access event comprising an end user service journey may incorporate one or more communication systems metadata, where the type and method of the communications is identified, though the specifics of the communications, for example email, phone number or other PII is only made available by the provider systems in the form of a temporally limited token when that end user service journey is active with one or more agent.

This approach of managing the end user service journey as a set of access events, where the access event state is stored in one or more repository, in whole or in part as tokenized data, and the PII for an interaction with an end user is only made available when the agent end user interaction is live, enables ML/AI systems to evaluate the access event data sets whilst maintaining the confidentiality of the end user PII. This can involve for example, the deployment of one or more data structures that effectively store this end user service journey data against metadata to create comprehensive end user profile records, which is a critical factor for system performance in a high-traffic database environment.

One aspect may be synchronizing an agent workspace with the appropriate access event for an end user service journey and aligning the appropriate tokenized data to be available to that agent in support of that access event at that time. The diversity of types of metadata available across multiple industries adds a degree of complexity, however the use of end user service journeys, access events and tokens provides a suitable generalized methodology that allows one or more end user service operations to tailor their interactions to the benefit of individual end users and providers.

Part of this approach is the use of digital twins, which represent end user service journeys and the access events thereof in any arrangement.

FIG. 8 illustrates a flowchart for an example method 800, according to example embodiments of the present disclosure. It will be appreciated that the method 800 is presented with a high degree of generality for clarity and ease of understanding. Therefore, the steps presented herein should be understood to be for illustrative purposes only and not as limiting. Additional steps may be included in some embodiments of the method 800 which may or may not comprise components of a step illustrated herein. Likewise, steps illustrated herein may be excluded by some embodiments of the method 800 as well.

At block 802, an example database stores personally identifying information (PII) about an end user in a database. For example, a database 120 operated by a financial services company 160 may store an end user's 150 name, date of birth, social security number, account number, security questions, and answers to the same.

At block 804, an example token management system organizes the database into tokens. For example, a token management system 110 may segment the security questions and answers into a first token, the name and account number into a second token, and the date of birth and the social security number into a third token.

At block 806, the example token management system determines, upon receiving a request for the PII from an agent in communication with the end user, that the agent is authorized to access the PII. For example, an agent 170 in a client services role may receive a phone call from the end user 150 requesting a change to the end user's 150 account. The agent 170 may require one or more successfully answered security questions to access the end user's 150 account, and may therefore request the security questions from the token management system 112. The token management system 112 may inspect audio from the phone call to determine that an individual claiming to be the end user 150 is requesting account changes which require verification via the security questions. The token management system 112 may therefore retrieve the first token from the database 120.

At block 808, the example token management system grants the agent temporary access to the PII. For example, the token management system 112 may place the first token containing the security questions and answers as a payload 140 into an encrypted temporary storage 114 associated with an agent workspace 134 of the agent 170. The agent 170 may then be permitted to access the first token for a limited and predetermined period of time (e.g. 15 minutes).

At block 810, the example token management system removes the PII from a device associated with the agent. For example, the token management system may direct a hard drive controller to overwrite a section of the encrypted temporary storage 114 containing the first token with, for example, all 1s, all 0s, or randomly set bits. The token management system may also purge any registers which may have contained the PII in whole or in part in volatile memory.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as infrastructure processing units (IPUs), graphical processing units (GPUs), data processing units (DPUs), ASICS, FPGAS, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

We claim:

1. A system, comprising:
a provider database storing personally identifying information (PII) about an end user;
an agent in communication with the end user; and
a token management system, wherein the token management system is configured to:
organize data in the provider database into tokens,
determine, using a machine learning model, upon receiving a request for the PII from the agent and based on information from audio communications between the agent and the end user, that the agent is authorized to access the PII, and a permitted portion of the PII the agent is authorized to access and a permitted duration of the access;
grant the agent temporary access to the permitted portion of the PII by providing the permitted portion of the PII in a tokenized form to a device associated with the agent, and
after the permitted duration of the access, remove the PII from the device associated with the agent.

2. The system of claim 1, wherein the machine learning model is trained with a digital twin of a previous access event, the previous access event including an interaction between a prior user and a prior agent that includes access by the prior agent to the prior user's PII.

3. The system of claim 1, wherein the machine learning model receives audio data from a call between the agent and the end user, and wherein the machine learning model outputs an access event associated with the call based upon a content of the received audio data.

4. The system of claim 1, wherein the removing the PII includes overwriting a section of non-volatile storage.

5. The system of claim 1, wherein the temporary access is time-limited.

6. The system of claim 1, wherein the temporary access is granted or curtailed responsive to a trigger action or event occurring.

7. The system of claim 1, wherein granting access includes retrieving a token containing the PII from a database.

8. The system of claim 1, wherein the token management system is further configured to:
   receive new PII about the end user;
   segment the PII into one or more tokens; and
   store the one or more tokens in a database.

9. The system of claim 1, wherein the PII includes at least one of a name, an address, an identification number, an account number, and a date of birth.

10. The system of claim 1, wherein the token management system is further configured to determine the permitted portion of the PII the agent is authorized to access, by determining a problem the end user is attempting to solve and identifying PII that is appropriate for resolution of the end user's problem.

11. A method, comprising:
   storing personally identifying information (PII) about an end user in a database;
   organizing data in the database into tokens;
   determining, using a machine learning model, upon receiving a request for the PII from an agent in communication with the end user and based on information from audio communications between the agent and the end user, that the agent is authorized to access the PII, and a permitted portion of the PII the agent is authorized to access and a permitted duration of the access;
   granting the agent temporary access to the permitted portion of the PII by providing the the permitted portion of the PII in a tokenized form to a device associated with the agent; and
   after the permitted duration of the access, removing the PII from the device associated with the agent.

12. The method of claim 11, wherein the machine learning model is trained with a digital twin of a previous access event, the previous access event including an interaction between a prior user and a prior agent that includes access by the prior agent to the prior user's PII.

13. The method of claim 11, wherein the machine learning model receives audio data from a call between the agent and the end user, and wherein the machine learning model outputs an access event associated with the call based upon a content of the received audio data.

14. The method of claim 11, wherein the temporary access is granted or curtailed responsive to a trigger action or event occurring.

15. The method of claim 11, wherein granting access includes retrieving a token containing the PII from a database.

16. The method of claim 11, further comprising:
   receiving new PII about the end user;
   segmenting the PII into one or more tokens; and
   storing the one or more tokens in a database.

17. The method of claim 11, further comprising:
   determining the permitted portion of the PII the agent is authorized to access by determining a problem the end user is attempting to solve and identifying PII that is appropriate for resolution of the end user's problem.

18. A non-volatile computer-readable memory storing instructions which, when executed by a processing device, cause the processing device to:
   store personally identifying information (PII) about an end user in a database;
   organize data in the database into tokens;
   determine, using a machine learning model, upon receiving a request for the PII from an agent in communication with the end user and based on information from audio communications between the agent and the end user, that the agent is authorized to access the PII, and a permitted portion of the PII the agent is authorized to access and a permitted duration of the access;
   determine, using a machine learning model, upon receiving a request for the PII from an agent in communication with the end user and based on information from audio communications between the agent and the end user, that the agent is authorized to access the PII, and a permitted portion of the PII the agent is authorized to access and a permitted duration of the access; and
   after the permitted duration of the access, remove the PII from the device associated with the agent.

19. The non-volatile computer-readable memory of claim 18, wherein the machine learning model is trained with a digital twin of a previous access event, the previous access event including an interaction between a prior user and a prior agent that includes access by the prior agent to the prior user's PII.

20. The non-volatile memory of claim 10, wherein the instructions are further configured to cause the processing device to determine the permitted portion of the PII the agent is authorized to access, by determining a problem the end user is attempting to solve and identifying PII that is appropriate for resolution of the end user's problem.

* * * * *